United States Patent [19]

Petrey, Jr. et al.

[11] 3,923,954
[45] Dec. 2, 1975

[54] METHOD FOR, AND COMPOSITION USED IN, FLUID TREATMENT

[76] Inventors: Ernest Quentin Petrey, Jr., 44 Center Grove Road, Randolph Township, N.J. 07801; Clinton Dale Breland, 2914 Peach Lane, Pasadena, Tex. 77502

[22] Filed: Dec. 4, 1970

[21] Appl. No.: 95,065

[52] U.S. Cl. .............. 423/210; 423/220; 423/223; 423/226; 423/229; 423/235; 423/243; 210/59
[51] Int. Cl.² .......................................... B01D 53/34
[58] Field of Search .............. 23/2 R, 2 S, 2 E, 2 A, 23/225 R; 260/429 J; 423/210, 226, 228, 229, 243, 220, 223, 235; 210/59, 60

[56] References Cited
UNITED STATES PATENTS

| | | | |
|---|---|---|---|
| 1,990,217 | 2/1935 | Baehr et al. | 23/2 R |
| 2,378,689 | 6/1945 | Collins | 23/2 R |
| 2,475,334 | 7/1949 | Oldach | 23/2 R |
| 2,983,685 | 5/1961 | Harbin | 23/2 R |
| 3,137,654 | 6/1964 | Johnson et al. | 23/2 R |
| 3,246,654 | 4/1966 | Stahly | 23/2 S |

Primary Examiner—Earl C. Thomas
Attorney, Agent, or Firm—Marn & Jangarathis

[57] ABSTRACT

Separation of acidic materials from fluids and optional recovery of the acidic materials, wherein the ratio of the amount of the acidic material to the amount of absorbent agent, and/or the concentration of the absorbent agent in the absorbent medium are enhanced by the incorporation of a multi-component additive composition comprised of one or more of each of the following four components; namely, chelating agents, divalent metal ions, trivalent inorganic acid esters and amino acids or amino acid derivatives.

40 Claims, 1 Drawing Figure

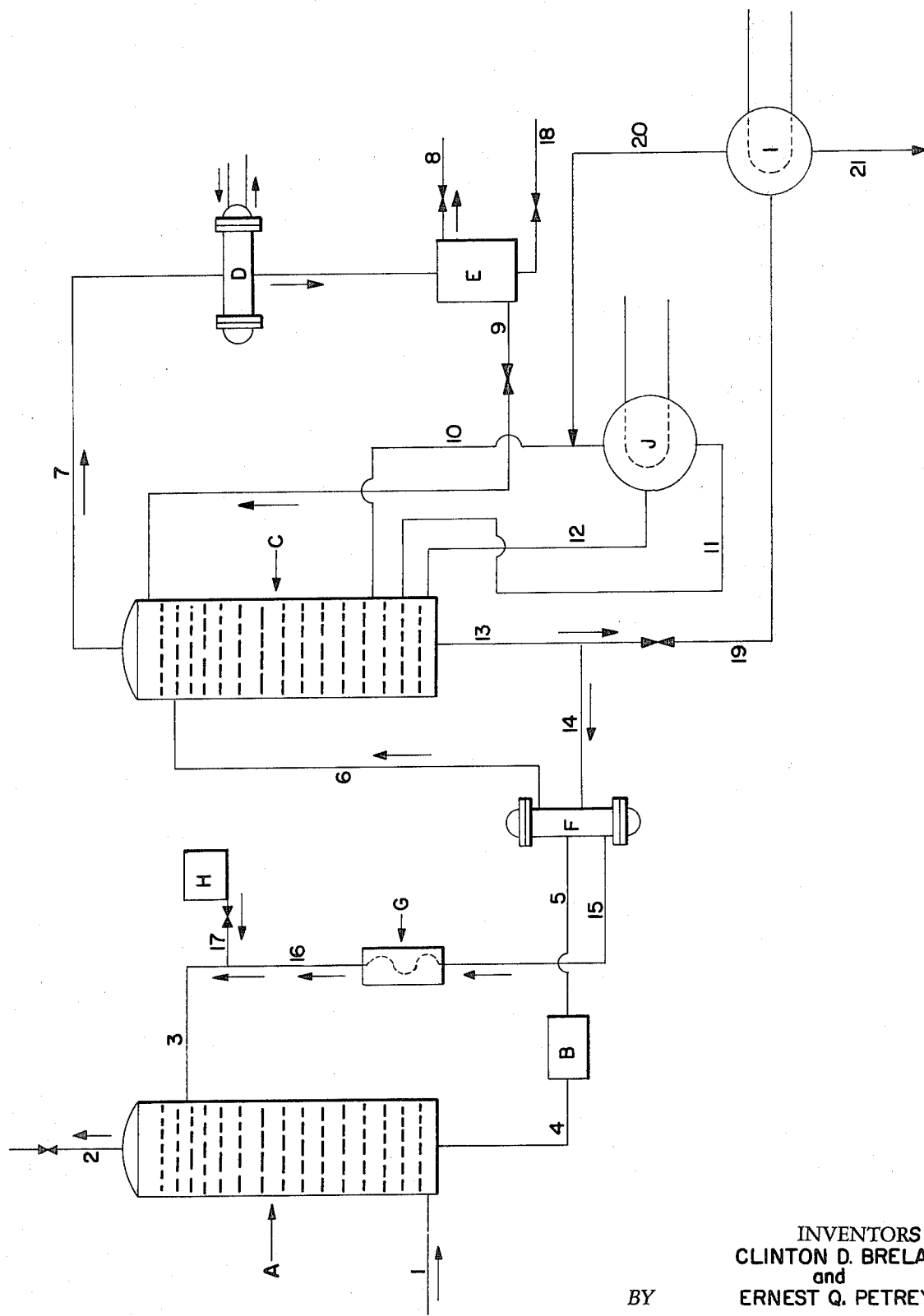

METHOD FOR, AND COMPOSITION USED IN, FLUID TREATMENT

This invention relates to the treatment of fluids containing acidic materials. In one aspect this invention relates to the prevention of corrosion of metallic surfaces by aqueous solutions. In another aspect this invention relates to an improved method for the removal of acidic materials, such as hydrogen sulfide, from fluids containing same. In another more specific aspect, the invention relates to the control of the corrosiveness of both the aqueous absorption solution used for recovering and/or separating acidic materials from fluids, and the control of corrosion due to the presence of the acidic materials, and to the composition for accomplishing same.

The term "acidic material(s)" is intended to mean those gases, or liquids which in a water solution have an acid reaction, but which are released unchanged upon sufficient heating of the water. Carbon dioxide, hydrogen sulphide, sulfur dioxide, sulphur trioxide, nitrous oxide, carbon monoxide, nitric oxide, are typical examples of acid materials which are present in the gaseous mixtures commonly encountered in industrial operations. It is seen that the above molecules may be present, and subsequently separated, either in the gaseous phase, or if moisture is present, then as dissolved acids in a liquid phase, according to this invention.

Many gases used commercially for various purposes contain acidic materials which are detrimental to the use of these gases. Particularly, normally gaseous mixtures containing hydrocarbons, for example, natural gas and light gases obtained from various hydrocarbon conversion processes, are used as fuel, as feed to hydrocarbon conversion processes, and in the production of carbon black. Acidic impurities, such as hydrogen sulfide, sulfur dioxide and carbon dioxide, contained in these gases often interfere with chemical reactions in which the gases are involved as well as being injurious to equipment which the gases contact. The detrimental effect of the acidic materials necessitates their removal from the gases. These acidic materials may be removed and recovered from the gases as valuable products, especially hydrogen sulfide which may be converted to elemental sulfur. From an olfactory aspect it is also desirable in many cases to remove acidic material from gases vented to the atmosphere such as flue gases and waste refinery gases.

Generally, fluids containing the acidic materials, which may or may not be considered to be impurities are treated by contacting the fluid, either in the liquid or vapor phase, with a suitable absorption medium which comprises a solvent plus an absorption agent. Usually the medium is an aqueous solution of a water soluble amine, such as monoethanolamine, diethanolamine, triethanolamine, diglycolamine and diethanolamine-diethylene glycol, or mixtures of these amines or other suitable absorption agents. The fluid containing the acidic materials is passed into the lower portion of an absorption column to contact a down flowing liquid absorption medium. Treated fluid is removed from the upper portion of the column and the amount of acidic materials is substantially reduced. The absorption medium is passed from the absorption column, to a stripping or a reactivation zone for the removal of acidic materials from the absorption medium. The reactivated absorption medium is then recycled to the absorption column.

Optionally a filter stage for the removal of either or both of, particulate matter and degradation products of the absorption medium, can be interposed between the absorption column and the reactivation zone, or else be situated in some other appropriate location.

Such aqueous absorption media often becomes very corrosive to the metallic surfaces which they contact. For example, a monoethanolamine solution is susceptible to oxidation under certain conditions, and the monoethanolamine may be converted to aminoacetic acid as shown by the following reaction:
$NH_2CH_2CH_2OH + O_2 \rightarrow NH_2CH_2COOH + H_2O$ Aminoacetic acid is corrosive toward metal surfaces especially ferrous metal surfaces when present in the monoethanolamine solution containing carbon dioxide, and/or hydrogen sulfide. Consequently, amine solutions may become corrosive as a result of oxidation occurring when the solutions contact gases containing oxygen as the fluids do in some cases. Such corrosion of metallic equipment may occur to a highly undesirable extent when a sufficient quantity of aminoacetic acid or other by-products have accumulated in the amine solution.

An aqueous medium solution, which has become corrosive after being used for removing carbon dioxide and hydrogen sulfide from gases, will dissolve iron from the equipment upon being heated in the reactivator when the solution contains carbon dioxide. The dissolved iron will be precipitated from the solution when it is boiled or stripped during reactivation, so that the carbon dioxide is released from it, and the solution will dissolve more iron when it is again heated after being resaturated with carbon dioxide. By this cyclic action a rapid corrosion of equipment may occur. It is much to be desired therefore, to inhibit the aqueous absorption medium in such a manner as to prevent the corrosion of metallic surfaces of the system thereby.

The removal of acidic materials from fluids in the above described manner may occur at one or perhaps more points in the production of such materials as toluene, synthetic ammonia, synthetic rubber, sulfuric acid, aviation gasoline, ammonium nitrate, hydrogen, carbon monoxide, fuel gas, and light weight metals.

It is to be seen that the processes of this invention may be employed for a separation and recovery of these acidic materials from the mixture, or may be employed to purify other fluids by removal of said acid materials therefrom.

One object of this invention is to prevent the corrosion of metallic surfaces by aqueous absorption medium solutions in the presence of hydrogen sulfide, and other acidic materials.

Another object of this invention is to remove acidic materials from fluids containing the same, in an improved manner.

Still another object of this invention is to remove hydrogen sulfide and carbon dioxide from low-boiling hydrocarbon mixtures containing the same, in a more economical manner.

An object of the invention is to provide a novel additive composition for use in fluid separating systems.

Another object is to provide a composition which lowers the inherent corrosive effect of certain amino alcohols upon metallic surfaces.

It is also another object of this invention to provide a corrosion inhibitor for aqueous solutions of acid forming components.

It is still a further object of this invention to provide an improvement in the operation of the absorption-stripping cycle of an absorption process for the removal of acidic material from fluids containing the same.

Still another object is to provide a method for increasing the capacity of fluid throughout in fluid separating systems employing absorption media.

A yet further object of this invention is to provide a process and a composition for use therewith, to allow construction of fluid separating system employing absorption media of a reduced size at a lower cost while maintaining a given fluid throughout.

An additional object is to provide a method of reducing the maintenance required in a fluid separating system employing absorption media.

Yet another object is to provide a method for utilizing an increased amount of absorption medium within a fluid separating system without increasing the corrosive effect of said medium either prior to or subsequent to the absorption process.

One more object is the provision of a method and an additive composition for use therewith whereby the ratio of the molecular concentration of the acidic materials complexed with the absorption medium to the molecular concentration of the total absorption medium is increased over those ratios previously utilized, without increasing the detrimental effects from such ratio enlargements.

Other objects of the invention will in part be obvious and will in part appear hereinafter.

The invention accordingly comprises the several steps and the relation and order of one or more of such steps with respect to each of the others, and the product possessing the features, properties, and the relation of components which are exemplified in the following disclosure and the scope of the application which will be indicated in the claims.

For a fuller understanding of the nature and objects of the invention, reference should be had to the following detailed disclosure and the later discussed drawing.

For ease and convenience the discussion will relate to an amino alcohol system, but it is not intended to be limited thereto.

The process involves passing a fluid containing acidic materials to an absorption zone and contacting it with a suitable absorption medium containing an amino alcohol or other absorption agent, to remove or separate the acidic materials. In operation the stream containing acidic materials is introduced into the lower portion of an absorption column wherein it passes upward countercurrently to a down flowing liquid aqueous solution of an amino alcohol. The liquid aqueous solution is introduced and an effluent is removed from the upper portion of the absorption column. Enriched aqueous absorption medium is removed as a liquid from the lower portion of the absorption column and passed to the upper portion of a stripping or reactivation column. In the stripping column the acidic materials in the absorption medium are desorbed therefrom and are removed as a gaseous effluent from the upper portion of the stripping column. A reactivated liquid aqueous solution of the amino alcohol or other agent as used, is withdrawn from the lower portion of the stripping column and recycled (after cooling) to the absorption column.

This mode of operation is equally applicable to entirely gaseous, entirely liquid, or combination gaseous and liquid fluids.

In the instant invention, an aqueous solution of the amino alcohol, which is known to be corrosive toward metallic surfaces such as iron, aluminum copper, as well as copper alloys, is substantially prevented from corroding such surfaces and the other invention objects are accomplished by the incorporation of an inhibiting amount of a multi-component composition into the amino alcohol prior to absorption, said composition comprising:

1. one or more water soluble chelating agents, and
2. one or more water soluble divalent metal ions, and
3. one or more trivalent inorganic acid esters, and
4. one or more amino acids or derivatives thereof.

The divalent metal ions (I) may be derived from any water soluble salt of zinc, cadmium, copper, nickel, strontium and mixtures thereof. The concentration of the divalent metal ion in the formulation for the composition should be within the range 0.5 to about 5 parts per 100 parts of total composition. Little if any operational advantage is derived from utilizing more than about 5 parts of divalent metal ion per 100 parts of composition.

The chelating agent utilizeable herein is selectable from among any of the wide variety of water soluble chelating agents presently, or contemplated to be available in the marketplace, so long as it is compatible with the other components of the composition and with the metal surface being treated. Representative classes of these compounds include but are not limited to:

1. polycarboxylic-polyamine Compounds
2. hydroxy polycarboxcyclic acids
3. nitrilo polyacetic acids and;
4. amino alkylphosphonic acids; and salts thereof.

Among the polycarboxylic polyamine compounds which can be represented by the following structural formula:

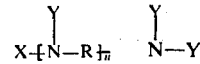

wherein X is —CH$_2$COOM or —CH$_2$CH$_2$COOM; Y is the same or different members of the group consisting of —H, —CH$_2$COOM, —CH$_2$CH$_2$COOM, wherein M is —H, —CH$_2$CH$_2$OH, an alkali metal, or ammonium radical; R is a hydrocarbon group containing from 2 to 6 atoms; and n is an integer from 0 to 4.

Mention may be made of ethylenediamine tetraacetic acid, ethylenediamine triacetic acid, triethylenetetramine tetraacetic acid and pentacetic acid, ethanol ethylenediamine triacetic acid, diethanol diethylene triamine triacetic acid, diethylene triamine pentapropionic acid, ethylene diamine triacetic acid of representative chelants of (Class 1).

Among the hydroxy polycarboxylic acid chelating agents, which are Class (2) chelants, mention may be made of citric, tartaric, gluconic, glucoheptonic and saccharic acid, and their water soluble alkali, and ammonium salts.

Within the Class (3) chelating agents, which is the class of nitrilo polyacetic acids, typical members include, nitrilodiacetic acid, nitrilotriacetic acid, nitrilo dipropionic acid, etc.

The fourth class of chelating agents utilizeable herein are the amino lower alkylphosphonic acids or their salts.

These compounds are more fully described in U.S. Pat. No. 3,234,124. The sodium, potassium, and ammonium salts of such acids may also be used. The chelating agents are used in a range of about 2.5 to about 15 parts by weight based upon 100 parts by weight of total composition. No particular advantage exists from the use of higher amounts of chelant.

The third component of the composition is a trivalent acid ester. These are prepared by the reaction of an inorganic acid which contains either of phosphorous, or boron in the trivalent state, with a compound that contains at least one available hydroxyl group. Of these, mention may be made of octyl and nonyl alcohols; phenols, such as nonylphenol; ethylene glycol, triethanol amine, diethylene glycol, ethoxylated fatty acids, such as ethoxylated stearic acid.

The trivalent acid ester is used in the range about 7.5 to about 30 parts by weight per 100 parts of total composition.

The fourth component, the amino acid or derivative is represented by the following formula:

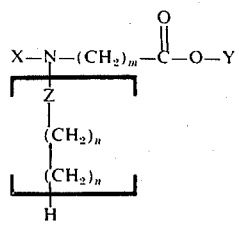

Wherein, Y is H, alkali metal or an ammonium radical; Z is any of:

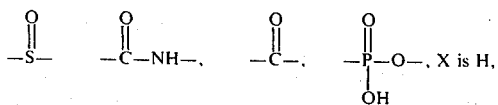

or an alkyl group containing from 1 to 6 carbon atoms, $m$ is an integer of from 1 to 6, $n$ is a number from 0 to 6 inclusive, and $q$ is 1 or 0. Typical compounds are sodium alkyl sulfonyl glycine, N-paratoluenesulfonyl glycine, and glycine.

This component is used in a range of from about 50 to 89.5 parts by weight per 100 parts of composition.

The compositions of this invention are prepared from the four essential components. In brief, the divalent ion salt, the chelating agent, the trivalent inorganic acid ester and the amino acid are mixed together under ambient temperature and pressure, to yield the composition. The ultimate physical form of the composition is dependent upon the physical state of the constituents, and may be in a paste, powder, solid, liquid or dispersion state. Thus, for example, a composition based upon N-alkyl sulfonyl glycine, zinc sulfate, ethylene diamine tetraacetic acid, and the phosphoric acid ester of octyl alcohol will be prepared in paste form. Whereas, if zinc chloride, nitrilo-triacetic acid, the boric acid ester of nonyl phenol, and glycine are used, a coarse granular product is prepared.

These four component compositions comprise the "inhibitor-cleaner additive" compositions of this invention, which are added to the absorption medium, for use in the fluid treating system.

The following non-limiting examples illustrate the preparation of compositions within the scope of this invention. For utilization of a corrosion inhibitor-cleaner within the scope of this invention in the operation of a fluid treating plant. See infra.

EXAMPLE I

Into a vessel are placed about:
300 grams of N-alkyl sulfonyl glycine
60 grams of the phosphoric acid ester of octyl alcohol
30 grams of E.D.T.A.; and
6 grams of zinc sulfate monohydrate and subjected to mixing by mechanical agitation for about 15 minutes. A substantially uniform paste has formed.

EXAMPLE II

Another composition is prepared which results in a paste, wherein amino trimethylphosphonic acid is substituted on an active basis in the same proportion for the E.D.T.A.

EXAMPLE III

A dispersion of the composition of Example I was prepared by mixing 60 parts of the paste with 40 parts of a light petroleum hydrocarbon oil, such as Gulf 2209 oil. It is to be understood that when utilized in this state, the non-toxic composition is rendered toxic by the presence of the oil.

EXAMPLE IV

A composition was prepared in paste form from the ingredients and amounts as in Example I, but with the substitution of 2 grams of copper sulfate for the 6 grams of zinc sulfate monohydrate.

Utilizing a simple mixing procedure an inhibitor composition of the following formulation can be prepared.

EXAMPLE V 3 grams Nickelous sulfate
15 grams E.D.T.A.
15 grams Phosphoric acid ester of nonyl phenol
67 grams Para-aminobenzoyl glycine

EXAMPLE VI 0.5 grams Cadmium chloride
2.5 grams N.T.A.
20.0 grams of the boric acid ester of ethylene glycol
77.0 grams glycine The additives of this invention are utilized in amounts determined by the mol loading, the concentration of the agent in the medium, and the nature of the fluid to be treated. The amount is usually within the range of about 400 to 1,000 ppm based on the weight of absorbant medium. It is believed, however, that as much as 10,000 ppm can be added to the system with no detrimental effects thereupon. "Mol loadings" is defined intra.

The FIGURE diagrammatically represents an arrangeemnt of apparatus for carrying out the process of this invention to be described more fully hereinafter. In order that this invention may be clearly understood and its applicability realized, a brief description of the process for the removal of acidic components from a stream by contact with a typical medium, namely a solution of an amino alcohol (typical agent) will be made. A hydrocarbon stream, such as sour natural gas containing hydrogen sulfide in an amount between about 2 to about 9,000 grains per 100 cubic feet of gas (standard conditions); that is, about 65 to about 290,000 parts per million, is passed to absorber A through line 1. The hydrocarbon stream passes upward through baffles, trays or packing in absorber A countercurrently to a down flowing liquid amine solution. A gaseous hydrocarbon stream substantially free from hydrogen sulfide and other acidic material is removed from absorber A through line 2. The hydrogen sulfide of the effluent hydrocarbon stream is substantially reduced. The liquid aqueous amine solution is introduced into the upper portion of absorber A through line 3. The enriched amine solution is removed from absorber A and is passed to the filter B through line 4, and thence to the heat exchanger F through line 5, and thence to stripper C through line 6.

Suitable temperatures and pressures are maintained in absorber A to ensure removal of substantially all of the hydrogen sulfide, and other acidic gases, from the hydrocarbon stream by absorption. The pressure within absorber A corresponds generally to the pressure available in the incoming hydrocarbon stream. The temperature is maintained in absorber A above the dewpoint of the hydrocarbon stream being treated. In general, the temperature is maintained between about 60° to about 150°F at an existing pressure between atmospheric and 300 pounds per square inch gauge. Hydrogen sulfide and other acidic materials dissolved in the enriched amine solution are desorbed in stripper C by heating with steam. Hydrogen sulfide and water vapor pass overhead from stripper C through line 7 and thence through condenser D to accumulator E. Water vapor is condensed in condenser D and the resulting condensate is collected in the lower portion of accumulator E. Hydrogen sulfide and other gases are vented from the system through line 8. A portion or all of the condensate in accumulator E is passed through line 9 to the upper portion of stripper C as a liquid reflux and, therefore, as make-up water for the system.

Part of the lean solution in the lower portion of the stripper C is withdrawn by line 11 to the reboiler J. The reboiler J is either direct fired or heated by an outside steam source. The reboiler causes part of the water to be converted to steam that enters the stripper C through line 10. The remainder of the solution is returned to the stripper C through line 12.

Optionally a side stream of the lean amine solution line 19, is passed to the reclaimer I where the internal temperature is raised to such a point (usually 240°–280°F) so that amine will distill and be returned to the system through line 20 and degradation products and inorganic materials will be removed from the recirculating system. Periodically the reclaimer I is discharged to waste through line 21. The reclaimer is heated by steam or direct fire.

Liquid amine solution, substantially free from hydrogen sulfide, accumulates in the lower portion of stripper C. The reactivated amine solution is withdrawn from stripper C through line 13 and may be recycled directly to absorber A through line 14, heat exchanger F, line 15, cooler G, and line 16.

Generally a temperature between about 200° and about 300°F, and a pressure between about atmospheric and about 30 pounds per square inch gauge are maintained on stripper C. Stripper C contains conventional bubble trays, baffles or packing to ensure effective removal of acidic material from the amine absorption liquid.

Make-up absorption liquid inhibitor, and make-up water may be added to the surge tank H and to the system through line 17 when necessary. Unrecycled condensate is discharged through line 18.

The above described treatment facility can be modified as is known in the art for particular fluid treatment problems. It is seen of course, that $H_2S$ is merely representative of any and all of the acidic contaminants that can be removed in a system of this design. Other representatives agents would similarly function in place of the amine alcohol in the facility of this design.

As will be apparent from the discussion above in the skilled, it will be seen that the process can be utilized in the treatment of such fluids as natural gas, coke oven gases, "synthetic" gas, petroleum refinery gas streams, certain other hydrocarbon streams, emissions from the burning of fosil fuels, emissions from the incineration of waste products, emissions from the recovery boilers utilized in the pulp and paper industry, among others, all of which contain one or more of the acidic materials.

It is known to the art of fluid treatment that in the design construction, and operation of fluid treatment facilities a number of important factors must be considered. These include, but are not limited to, (1) concentration of absorption agent; (2) the rate of circulation of the medium through the system (facility); (3) the ratio of the amount of acidic materials to the amount of absorption agent, —when the agent utilized undergoes a chemical reaction with the acidic material, such an agent being for instance an amino alcohol, for example, diethanolamine,—this ratio is referred to as the mol loading; (4) the amount of fluid, either the amount available for treatment or the amount of fluid which one desires to treat in a stated amount of time.

It goes without further discussion that from a cost point of view, one would like to treat the maximum amount of fluid possible in the smallest physical plant with the least amount of capital outlay. To achieve this, one would try to utilize the highest possible mole loading attainable, a circulation rate (a term known to the art) optimized with respect to the plant size and power consumption, the highest possible concentration of absorption agent, and the minimum amount of expenditure for maintenance and repair of the facility.

In actuality however, the experience of industry has been the achievement of less than the ideal in the operation of fluid treatment facilities. It is known that an absorbent is capable of absorbing up to a one to one, mol to mol, ratio of mixed acidic materials in an ideal system. In operation however, attempts to utilize ratios of about 1.0 mols of acidic material per mol of absorbent agent result in severe corrosion of the system's metallic surfaces within about 48 to 60 hours. Experience of industry has shown that at a mol loading of about 0.35 mols of acidic material/mol of absorbent agent, that the fluid throughout is maximized and corrosion is minimized. A definite duration of time can not be indicated prior to which severe corrosion will occur at this 0.35 mol loading, as many other variables, including system design, gas composition, circulation rate, heat balance, etc. will affect the rate of and amount of corrosion.

The ideal concentration of absorption agent would approach 100 percent, i.e., a diminimus amount of solvent, assuming the agent is a liquid, or one that can be made liquid. It is known to physical chemists that the more a liquid is diluted, the boiling point of the entire solution will approach that of the dilutent. As the boiling point of the medium is lowered by dilution, the ease of removing the incarcerated acidic materials becomes increased, for several reasons, a key one of which is the requirement of less heat, at the time of such removal step, for its accomplishment.

Not only must the ease of operation and cost of operation be considered in the discussion of the concentration, but also the inherent corrosive effect of the absorbent medium, without the presence of the acidic materials therein, must be considered.

It is known in the art that as the concentration of the absorption medium, without a corrosion inhibitor, is increased, the inherent corrosive effect of the medium also increases. A leading Texas chemical company advises, for instance, that monoethanolamine aqueous solutions of a concentration higher than 20 percent should be avoided due to their corrosiveness.

With the incorporation of prior art inhibitors the concentration of monoethanolamine should not be raised above this 20 percent level. Other absorbent media are also found not to have their own inherent corrosive effect reduced at high concentration by the incorporation of inhibitors of the prior art. Other absorption media also have their own optimized concentration cut off point.

The circulation rate is calculated so that the required amount of acidic material is removed during the period of travel of the absorbent medium through the entire facility, i.e. through the contactor, the stripper and associated equipment. It is known that if the circulation rate can be diminished, while maintaining adequate removal of the impurities, a conservation of power and other costs will be effected.

It is seen therefore that the design and operation of such treatment facilities is influenced by the attempt to optimize a balance in the achievement of the ideal circulation rate, concentration of agent, ratio of amount of acidic material to the amount of agent, as well as the amount of fluid to be treated.

The greatest hindrance in man's attempt to achieve the ideal of each of the above influences on the system's operation is the matter of corrosion. As alluded to previously there is the problem of the inherent corrosive effect of the medium upon the metallic surfaces of the system. This problem could be overcome by the use of a stainless steel or other low carbon steel substitutes, but the cost factor involved prevents this.

Some of the other detracting factors from the achievement of the ideal include but are not limited to, the nature of the solvent, albeit generally water. The impurities found in the water utilized in the replacement of lost solvent influence the effective operation of the system. While the use of demineralized water would remove this detrimental factor, the cost of such can be as high as 10 times the cost of water available at the site. Another factor is the introduction of contaminants, both particulate and nonparticulate into the system from external sources. For instance, foreign matter from the fluid pipeline or fluid storage tank may enter into an otherwise clean system during the time of introduction of the fluid for treatment in the facility.

All of the above discussion including that relating to the drawing has centered upon the treatment facilities whose modus operandi is the use of a complete cycle involving adsorption-desorption-recycling of the desolved medium - re-adsorption ad infinitum with loss makeup. Among the other treatment facilities whose design, construction and operation can be influenced according to this invention mention may be made of those wherein the modus operandi involves a non-regenerative adsorption process, which includes the steps of adsorption and recirculation until a tolerance level is reached, followed by a discharge of the medium with subsequent introduction of new medium to be utilized until its tolerance level is reached. By tolerance level we mean, the point at which a maximum amount of impurities are entrapped, without damaging the system. At this point, the medium containing the impurities is discharged and replaced. Typical installations of this nature include facilities for the treatment of the emissions from the burning of fossil fuels, those for the treatment of waste product incinerator gaseous emissions, facilities for the treatment of fluids in conjunction with chemical and industrial processes, such as emmissions from recovery boilers in the pulp and paper industry, for both environmental and product recovery reasons, as well as any other situation wherein the treatment of gaseous or liquid effluents is deemed essential. Typical contaminants removed in such non-regenerative operations include sulfur dioxide, carbon dioxide, other acidic oxides, and HCl, among others.

We have now found a way to more closely approach the operation of a fluid treatment facility under ideal operating conditions. By this we mean that in the optimization of the balance of the several facets affecting the operation, namely the circulation rate, concentration of agent, ratio of amount of acidic material to the amount of agent, as well as the amount of fluid to be treated, we can raise the ratio of acidic material to agent, and raise the concentration of agent in the medium, while still maintaining an overall balanced system which more closely approaches an ideal system.

This achievement is accomplished by the incorporation of an amount of our additive to cleanse the system of currently present corrosion products, to inhibit the deposition of further corrosion products, reduce the inherent corrosive effect of the medium, reduce the corrosive effect of the acidic materials, thereby greatly reducing the reduction in heat transfer caused by the presence of corrosion product deposits, improve the filter life due to a lessening of the amount of particulate matter in the system, increase the life expectancy of the tube bundles of both the reboiler, and the reclaimer by the prevention of "hot spots" which are caused by the deposition of corrosion products thereon, as well as to act as a preventive maintenance agent for all of the associated equipment.

It is seen, therefore, that not only do we inhibit the deposition of particulate matter, such as iron sulfides, and iron carbonates, but we substantially prevent the actual formation of these compounds such that deposition cannot occur.

It has been found that whereas prior art inhibitor-cleaner compositions had the ability to inhibit corrosion, they had substantially little effect upon the ability to raise the mol loading, without causing severe corrosion. On the other hand, our compositions when used in fluid treatment facilities will allow mol loadings to be raised to levels of about 0.80 without an increase in corrosion levels. The actual amount needed to achieve these raised levels without corrosion is dependent upon the various factors (circulation rate, etc.) as well as the nature of the fluid to be treated.

It has been found that by elevating the ratio of the amount of incarcerated acidic material to the amount of agent, (mol loading where the term is applicable)

without the detrimental effects normally associated with such higher mol loadings that several benefits are attainable. Among these are the facts that a larger volume of gas can be treated in an existing plant; and by the use of a lower circulation rate when treating the same amount of gas, a power saving can be effected.

We have further found that by the use of an adequate amount of our composition, the concentration of the absorption agent in the absorption medium can be raised to at least as high as 65 percent, without any detrimental effect.

The use of higher concentrations of monoethanolamine or other absorption agent in the gas treating system, without the deleterious effects normally obtained from the use of such higher concentrations gives rise to several beneficial results in the system's operation. Thus by maintaining the existing circulation rate of the medium, a larger volume of gas can be treated in this higher concentration but same volume of medium.

Secondly, by maintaining the existing volume of gas to be treated, a lower circulation rate may be utilized thereby effecting a reduction in power consumption to treat the same amount of gas with this higher concentration of agent.

It has also been found, contrary to expectation that not only can the "ratio", and the "concentration" be raised individually without anticipated detrimental effects, but both of these can be increased together to those levels to which each can be raised individually with the enjoyment of the freedom from the anticipated detrimental effects associated with each.

One familiar with the design and operation of fluid treating facilities, will readily realize the benefits to be derived from the incorporation of the potentially enhanceable ratio factor, and the potentially enhanceable concentration of agent in the medium factor, both being obtained by the use of our additives into the design of new facilities and the operation of old plants.

Those benefits which can be realized include the reduction in capital outlay for new construction, and the reduction in operating costs including maintenance, power consumption, and water treatment among others, all of which are allocated on a per unit of fluid to be treated basis.

It is seen also that plants of smaller size can be constructed which incorporate into their design and operation, our enhanceable "factors," for the treatment of the same volume of fluid formerly treated in larger plants.

These enhanceable factors can not only be integrated into the design and operation of regenerative cycle type plants but also into the design and operation of non-regenerative cycle plants. Formerly in the latter, it was deemed necessary to use costly stainless steel or other resistant materials in the fabrication of the facility. Now, due to the higher tolerance level of acidic material that can be allowed to build up in the medium without a corrosive effect, mild steel can be substituted for the stainless steel. This represents a significant cost reduction.

In view of the ability to recycle the absorbent through the system until higher levels of acidic materials are entrapped therein without causing damage to the metal of the system, by the use of our additives, the problem of disposal of waste medium is reduced and the amount of solvent required (usually water) is lessened. These in turn influence the cost of maintenance of the operation of the facility.

The following non-limiting examples illustrate the utilization of our additives in both regenerative and non-regenerative fluid treating facilities.

EXAMPLE VII

An amino alcohol gas treating system which contains 14,000 gallons of absorbent medium and which operates in a manner similar to the process described, had been in operation of 18 months with out the use of a chemical corrosion inhibitor in the system. During this 18 month period, corrosion was evidenced by the presence of iron particulate, found at the end of the period in the absorption medium in an amount in excess of 300 ppm based on the weight of medium. At the end of the 18 months, mild steel corrosion coupons, i.e., rectangular solid specimens 1 inch × 3 inch × 1/16 inch, were placed in the system and after 30 days exposure, were found to be encrusted with iron sulfide, (a corrosion product) and the resultant weight loss was calculated to yield an average corrosion rate determined to be 31.6 m.p.y.

The mathematical calculations required to determine the amount of weight of the coupons lost due to the chemical interactions, which corrosion products are removed from the coupon to determine resultant weight of the coupons, as expressed in grams, from which the corrosion rate can be determined are found in A.S.T.M. designation: G 1–67.

It was found that the large amount of iron sulfide present in the operating system caused reduction in throughput of gas due to the plugging or fouling of the absorber.

It is to be seen that a visual inspection of the absorber and associated equipment would show the presence of iron sulfide and other contaminants. However, no indication of the rate of corrosion would be possible from such inspection. Accordingly, a standardized determination of the corrosion rate was made by use of the coupon insertion method.

The operators found that during the initial 18 months, plus the one month period wherein the standardized corrosion rates were being determined that it was necessary to change the filters in the recirculating lines weekly due to the presence of corrosion products.

A composition prepared according to Example I of this application was added to the system to achieve a level in the system of 500 ppm based on the weight of medium. Subsequent additions were used to maintain this level, as required. After treatment of the system for 60 days, following the previous 19 months, new coupons inserted in the system for the period of months 20, and 21, in the same locations at the previous set of newly removed coupons showed an average corrosion rate of 1.2 m.p.y.

The total iron content found in both the rich and lean solutions, (absorption medium) was reduced to below 1.0 ppm. Prior to month 20, i.e., the period wherein no inhibitor was utilized, filter life averaged about 1 week after the instant inhibitor was added, filter life was found to be extended to an excess of 2 months prior to change requirement.

EXAMPLE VIII

In a plant using an MEA-Water Solvent System as the absorbent medium, to treat natural gas, it was found that the capability of the plant to produce treated natural gas has been reduced from a rated capacity of 10 MMSCFD (million standard cubic feet per day), to 3

MMSCFD, due to (a) reduction in the diameter of the assorted piping, tubes, pumps, and assorted equipment, by the presence of deposition of corrosion products therein, which in essence limited throughput, and (b) the reduction of heat transfer in the amine/amine exchanger and in the lean amine cooler, also due to the presence of corrosion products in the exchanger and the cooler which in essence limited the heat transfer capacity in view of the insulating characteristics of the deposits.

A corrosion inhibitor-cleaner composition prepared in accordance with Example I, to which had been added and mixed therewith 4 parts of water to facilitate addition to the system was added at the rate of 1 part of composition to 8,000 parts of absorbent medium, and maintained at that level. After the presence of the composition at the set level, 30 days, the heat exchange valves had increased 40 percent and the system showed an increase in throughput to 5.2 MMSCFD.

After a total of 42 days the throughput of the system was found to be 7.0 MMSCFD, with throughput was limited only by gas availability and not due to the capacity of the system at that time. It was further found that at the end of this 42 day period the heat exchange valves were equal to design specification.

EXAMPLE IX

A natural gas treating system located in the Permian Basin of West Texas has been in operation at a mol loading of 0.32 mol "sour" gas/mol MEA, without the incorporation of any inhibitor-cleaner. In the first stage of our program, 720 ppm of an inhibitor composition according to our Example I was added to the system. While the mol loading was maintained at its former level, substantially all built up corrosion deposits were removed, and eliminated from the system by the filter and the reclaimer. Continued application of our inhibitor-cleaner maintained the noncorrosive character of the system resulting in the prevention of new deposits of corrosion products therein. In view of this noncorrosive environment, it was found that the mol loading could be raised to 0.72 mol sour gas/mol MEA without any detrimental effect on the metallic surfaces. To the best of applicant's belief this was the first time that mol loadings of such sour gas treating systems had ever been raised to a level above 0.4 without any deleterious effect upon the system's metallic surfaces.

EXAMPLE X

Leading manufacturers of monoethanolamine have up to the present advised consumers that due to the inherent corrosive nature of the compound that when used in conjunction with water as an absorbent medium for gas treating that concentrations over 20 percent should be avoided, even when a corrosion inhibitor is added to the system. Such 20 percent concentration was being utilized at a gas treating plant in West Texas with a prior art inhibitor. When one of our inhibitor-cleaners was substituted in the system, and all corrosion deposits removed and flushed out from the system, it was found that upon increasing the concentration of monoethanolamine incrementally, and checking at each 5 percent incremental concentration addition, that concentrations as high as 40 percent could be reached, without any deleterious effect to the metal surfaces, and further that after 30 days no corrosion was evident.

EXAMPLE XI

In a prototype non-regenerative $SO_2$ absorption system constructed of mild steel (low carbon) the corrosion rates were in the range of 30 to 50 mpy. By the addition to the system of 600 ppm of a composition similar to the composition of Example 1 the corrosion rates were reduced to between 2 and 3 mpt.

EXAMPLE XII

At a natural gas production plant laboratory, evaluations were conducted to determine the benefits to be obtained from the incorporation of the inhibitor-cleaner compositions according to this invention into the plant systems. Two test absorption medium systems were prepared. The first was a mono-ethanolamine-diethanolglycol and the second was a digylcolamine system. For the first, a solution of 18% MEA, 70% DEG and 12% water, was prepared and placed into two 1 liter flasks. For the second, a solution of 70% diglycol amine and 30% water was prepared and placed into two 1 liter flasks. In one of the flasks intended for each system the composition of Example 1 was added to a concentration of 400 ppm. It is seen that for each of the systems one of the flasks contains no additive.

Into each of the four flasks one each of copper, steel, and aluminum coupons, respectively were placed.

Carbon dioxide was continuously bubbled through the solution of the four flasks to establish a loading of 0.9 mols carbon dioxide per mol of MEA-DEG in the MEA-DEG system, and a loading of 0.14 mols of carbon dioxide per mol of DGA in the DGA system.

Tests were conducted for a period of 14 days at 220°F in accordance with the procedure known in the art to obtain the amount of corrosion from the coupons which in essence simulates the amount of corrosion that would be obtained from an iron containing system utilized under similar operating conditions.

| TEST | Iron in solution PPM |
|---|---|
| 1. MEA-DEG Blank | 200 PPM |
| 2. MEA-DEG with composition | 10 PPM |
| 3. DGA Blank | 30 PPM |
| 4. DGA with composition | 2 PPM |

Applicants have made a diligent study of the art of gas treatment utilizing amino alcohols and related compounds in solution as an absorption medium. Many of these prior art processes are deemed satisfactory in operation, but most of these processes have various drawbacks. For instance, in U.S. Pat. No. 2,031,632 wherein sodium metavanadate is utilized as the corrosion inhibitor for the metal surfaces, it is found that the level of addition of vanadate to achieve such inhibition is incapable of predetermination. In the process of Meyers, U.S. Pat. No. 2,487,578, chrom gluconates are utilized for corrosion inhibition. While the amount of corrosion inhibition obtained in 1949 may have been considered satisfactory then, such levels of inhibition are deemed unsatisfactory to industry today. Fischer, U.S. Pat. No. 2,869,978, disclosed the use of antimony compounds for metal surface protection. These compounds are toxic and represent a danger to the system operators as well as wildlife, and plants, due to the usual surface disposition of the residue of the reclaimed absorbent solution which will contain minor amounts of the antimony compounds.

Our multi-component additive compositions are considered to be non-toxic according to the definition found in Sax's book, *Industrial Toxicology*.

In order to determine the relative toxicity of representative compositions within the scope of this invention a typical one was submitted to an independent testing laboratory for the conductance of toxicity studies.

White rats of uniform weight, after 12 hours of fasting received orally, the test material at various dosage levels. All animals were observed carefully for toxic signs.

Graduated doses were administered from 2 gm. of test material/Kg. of rat body-weight, to 30 gm./Kg. to 2 rats at each dose level. At no time were signs of toxicity observed. Finally, 10 rats, 5 males and 5 females, were given doses of 30 gm./Kg. No deaths or signs of toxicity were obtained.

When the animals were autopsied 14 days after dosage, no gross abberations in any organs were observed.

Therefore, the oral lethal dosage for a lower mammal is considered to be in excess of 30 grams of material per kilogram of body weight. From this it can be said that the $LD_{50}$, (i.e., the lethal dose of 50 percent of the test sample) is at least in excess of 30 gms./Kg, Whereas, for such chemicals as sodium chloride (table salt) the $LD_{50}$ is 2.6 gms./Kg. and for 10 percent acetic acid (household vinegar) the $LD_{50}$ is 3.53 gms./Kg.

As previously mentioned the compositions of this invention are considered safe to handle. They are not only non-toxic, but are substantially non-staining.

Not only can the instant processes be utilized in the separation and removal of acidic contaminants, but they are equally applicable to the separation of several components followed by the recovery of one or more of these. An example of this would be the recovery of sulfur dioxide from the exhaust emissions of fossil fuel fired furnaces, wherein the emissions are predominantly carbon dioxide and water vapor with the sulfur dioxide being a minor component.

Since certain changes may be made in the above products, compositions and processes without departing from the scope of the invention herein involved, it is intended that all matter contained in the above description shall be interpreted as illustrative and not in a limiting sense.

What we claim is:

1. In a process for removing acid gases from an acid gas containing fluid by contacting the fluid with an acid gas absorption solution, the improvement comprising:
    adding to the acid gas absorption solution a composition comprising:
    a. at least one compound selected from the group consisting of N-paratoluenesulfonyl glycine, paraaminobenzoyl glycine and the alkali metal and ammonium salts thereof and a compound having the following structural formula:

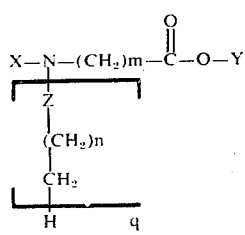

wherein X is a member of the group consisting of hydrogen and an alkyl group containing from 1 to 6 carbon atoms, inclusive, Y is selected from the group consisting of hydrogen, an alkali metal, and an ammonium radical, Z is selected from the group consisting of:

$m$ is an integer of from 1 to 6 inclusive, $n$ is a number of from 0 to 6 inclusive and $q$ is 1 or 0;
    b. at least one ester which is selected from the group consisting of phosphoric and boric acid esters of a compound which contains at least one available hydroxyl group;
    c. at least one water soluble chelating agent; and
    d. at least one water soluble salt of metal selected from the group consisting of zinc, cadmium, copper, nickel and strontium;
    said component (a) being present in an amount from about 50 to about 89.5 parts, component (b) in an amount from about 7.5 to about 30 parts, component (c) in an amount from about 2.5 to about 15 parts and component (d) in an amount from about 0.5 to about 5 parts, all by weight, based on 100 parts of the composition, said composition being added to the acid gas absorption solution to provide a corrosion inhibiting amount of said combination of components (a), (b), (c), and (d).

2. The process of claim 1 wherein component (c) of said at least one water soluble chelating agent is selected from the group consisting of:
    1. a compound having the following structural formula:

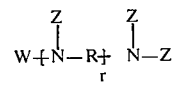

wherein W is selected from the group consisting of $CH_2COOM$ and $CH_2 CH_2COOM$; each Z is selected from the group consisting of -H, $CH_2COOM$ and $CH_2CH_2COOM$, M is selected from the group consisting of -H, $CH_2CH_2OH$, an alkali metal, and an ammonium radical, R is a hydrocarbon having from 2 – 6 carbon atoms; $r$ is integer from 0 –4
    2. a member selected from the group consisting of a hydroxy polycarboxylic acid, gluconic acid, glucoheptonic acid and the alkali and ammonium salts of the acid;
    3. a nitrilo polyacetic acid; and
    4. an amino lower alkylphosphonic acid and salts thereof.

3. The process of claim 2 wherein in component (b) said ester is selected from the group consisting of boric and phosphoric acid esters of a compound selected from the group consisting of octyl alcohols, nonyl alcohols, a phenol, an ethylene glycol, a triethanol amine, a diethylene glycol and an ethoxylated fatty acid.

4. The process of claim 3 wherein the acid gas absorption solution is an aqueous solution of an alcohol amine.

5. The process of claim 4 wherein in component (b) said ester is an ester of phosphoric acid.

6. The process of claim 5 wherein in component (c) said chelating agent is a compound having the structural formula (1).

7. The process of claim 6 wherein in component (b) said ester is a phosphoric acid ester of octyl alcohol.

8. The process of claim 6 wherein in component (b) said ester is a phosphoric acid ester of nonyl alcohol.

9. The process of claim 4 wherein component (a) is an N-alkyl sulfonyl glycine, component (b) is a phosphoric acid ester of octyl alcohol, component (c) is ethylene diamine tetraacetic acid and component (d) is a water soluble salt of zinc.

10. The process of claim 4 wherein component (a) is p-aminobenzoyl glycine, component (b) is a phosphoric acid ester of nonyl phenol, component (c) is ethylene diamine tetraacetic acid and component (d) is a water soluble salt of nickel.

11. The process of claim 4 wherein component (a) is N-alkyl sulfonly glycine, component (b) is a phosphoric acid ester of octyl alcohol, component (c) is aminotrimethylphosphonic acid and component (d) is a water soluble salt of zinc.

12. The process of claim 4 wherein component (a) is glycine, component (b) is a boric acid ester of ethylene glycol, component (c) is nitrilotriacetic acid and component (d) is a water soluble salt of cadmium.

13. The process of claim 4 wherein component (a) is glycine, component (b) is a boric acid ester of nonyl phenol, component (c) is nitrilotriacetic acid and component (d) is a water soluble salt of zinc.

14. The process of claim 4 wherein said composition is added in an amount to provide from about 400 to about 10,000 ppm of said combination of components (a), (b), (c), and (d) based on the weight of alcohol amine.

15. The process of claim 4 wherein said composition is added in an amount to provide from about 400 to about 1,000 ppm of said combination of components (a), (b), (c) and (d) based on the weight of alcohol amine.

16. In a process for removing acid gases from an acid gas containing fluid by contacting the fluid with an acid gas absorption solution, the improvement comprising: adding to the acid gas absorption solution a composition comprising:
   a. at least one compound selected from the group consisting of N-alkyl sulfonyl glycine, N-paratoluenesulfonyl glycine, glycine, p-aminobenzoyl glycine and the alkali metal and ammonium salts thereof;
   b. at least one ester which is selected from the group consisting of phosphoric and boric acid esters of a compound which contains at least one available hydroxyl group;
   c. at least one water soluble chelating agent; and
   d. at least one water soluble salt of a metal selected from the group consisting of zinc, cadmium, copper, nickel, and strontium; and component (a) being present in an amount from about 50 to about 89.5 parts, component (b) in an amount from about 7.5 to about 30 parts, component (c) in an amount from about 2.5 to about 15 parts and component (d) in an amount from about 0.5 to about 5 parts, all by weight, based on 100 parts of the composition, said composition being added to the acid gas absorption solution to provide a corrosion inhibiting amount of said combination of components (a), (b), (c) and (d).

17. The process of claim 16 wherein component (c) of said at least one water soluble chelating agent is selected from the group consisting of:
   1. a compound having the following structural formula:

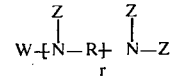

wherein W is selected from the group consisting of $CH_2COOM$ and $CH_2CH_2COOM$; each Z is selected from the group consisting of -H, $CH_2COOM$ and $CH_2CH_2COOM$, M is selected from the group consisting of -H, $CH_2CH_2OH$, an alkali metal, and an ammonium radical, R is a hydrocarbon having from 2 – 6 carbon stoms; r is integer from 0 – 4
   2. a member selected from the group consisting of a hydroxy polycarboxylic acid, gluconic acid, glucoheptonic acid and the alkali and ammonium salts of the acid,
   3. a nitrilo polyacetic acid; and
   4. an amino lower alkylphosphonic acid and salts thereof.

18. The process of claim 17 wherein in component (b) said ester is selected from the group consisting of boric and phosphoric acid esters of a compound selected from the group consisting of octyl alcohols, nonyl alcohols, a phenol, an ethylene glycol, a triethanol amine, a diethylene glycol, and an ethoxylated fatty acid.

19. The process of claim 18 wherein the acid gas absorption solution is an aqueous solution of an alcohol amine.

20. The process of claim 19 wherein in component (b) said ester is an ester of phosphoric acid.

21. The process of claim 20 wherein in component (c) said chelating agent is a compound having the structural formula (1).

22. The process of claim 21 wherein in component (b) said ester is a phosphoric acid ester of octyl alcohol.

23. The process of claim 21 wherein in component (b) said ester is a phosphoric acid ester of nonyl alcohol.

24. The process of claim 16 wherein component (a) is an N-alkyl sulfonyl glycine, component (b) is a phosphoric acid ester of octyl alcohol, component (c) is ethylene diamine tetraacetic acid and component (d) is a water soluble salt of zinc.

25. The process of claim 16 wherein component (a) is -aminobenzoyl glycine, component (b) is a phosphoric acid ester of nonyl phenol, component (c) is ethylene diamine tetraacetic acid and component (d) is a water soluble salt of nickel.

26. The process of claim 16 wherein component (a) is N-alkyl sulfonyl glycine, component (b) is a phosphoric acid ester of octyl alcohol component (c) is aminotrimethylphosphonic acid and component (d) is a water soluble salt of zinc.

27. The process of claim 16 wherein component (a) is glycine, component (b) is a boric acid ester of ethylene glycol, component (c) is nitrilotriacetic acid and component (d) is a water soluble salt of cadmium.

28. The process of claim 16 wherein component (a) is glycine, component (b) is a boric acid ester of nonyl phenol, component (c) is nitrilotriacetic acid and component (d) is a water soluble salt of zinc.

29. The process of claim 19 wherein said composition is added in an amount to provide from about 400 to about 10,000 ppm of said combination of components (a), (b), (c), and (d) based on the weight of alcohol amine.

30. The process of claim 19 wherein said composition is added in an amount to provide from about 400 to about 1,000 ppm of said combination of components (a), (b), (c) and (d) based on the weight of alcohol amine.

31. In the removing of acid gas from an acid gas containing fluid by contacting the fluid with an acid gas absorption medium containing an acid gas absorbent agent, a process for increasing the ratio of the amount of acid gas absorbed in the medium to the amount of absorbent agent in the medium and/or the amount of acid gas absorbent agent in said medium comprising:
adding to the medium (a corrosion inhibiting amount of) a composition comprising:
a. at least one compound selected from the group consisting of N-paratoluenesulfonyl glycine, paraaminobenzoyl glycine and the alkali metal and ammonium salts thereof and a compound having the following structural formula:

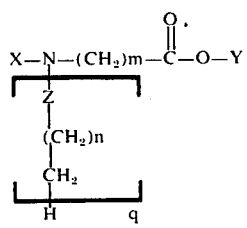

wherein X is a member of the group consisting of hydrogen and an alkyl group containing from 1 to 6 carbon atoms, inclusive, Y is selected from the group consisting of hydrogen, an alkali metal, and an ammonium radical, Z is selected from the group consisting of:

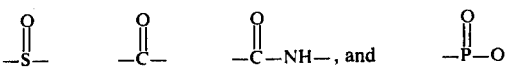

$m$ is an integer of from 1 to 6 inclusive, $n$ is a number of from 0 to 6 inclusive and $q$ is 1 or 0.
b. at least one ester which is selected from the group consisting of phosphoric and boric acid esters of a compound which contains at least one available hydroxyl group;
c. at least one water soluble chelating agent; and
d. at least one water soluble salt of a metal selected from the group consisting of zinc, cadmium, copper, nickel and strontium; wherein said component (a) is present in an amount from about 50 to about 89.5 parts, component (b) in an amount from about 7.5 to about 30 parts, component (c) in an amount from about 2.5 to about 15 parts and component (d) in an amount from about 0.5 to about 5 parts, all by weight, based on 100 parts of the composition; said composition being added to the medium to provide a corrosion inhibiting amount of said combination of components (a), (b), (c) and (d) sufficient to increase said ratio of acid gas to absorbent agent and/or the amount of absorbent agent in the medium.

32. The process of claim 31 wherein component (c) of said at least one water soluble chelating agent is selected from the group consisting of:
1. a compound having the following structural formula:

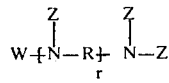

wherein W is selected from the group consisting of $CH_2COOM$ and $CH_2CH_2COOM$; each Z is selected from the group consisting of -H, $CH_2COOM$ and $CH_2CH_2COOM$, M is selected from the group consisting of -H, $CH_2CH_2OH$, an alkali metal, and an ammonium radical, R is a hydrocarbon having from 2–6 carbon atoms; $r$ is integer from 0–4
2. a member selected from the group consisting of a hydroxy polycarboxylic acid, gluconic acid, glucoheptonic acid and the alkali and ammonium salts of the acid;
3. a nitrilo polyacetic acid; and
4. an amino lower alkylphosphonic acid and salts thereof.

33. The process of claim 32 wherein in component (b) said ester is selected from the group consisting of boric and phosphoric acid esters of a compound selected from the group consisting of octyl alcohols, nonyl alcohols, a phenol, an ethylene glycol, a triethanol amine, a diethylene glycol and an ethoxylated fatty acid.

34. The process of claim 33 wherein the acid gas absorbent agent is an alcohol amine.

35. The process of claim 33 wherein in component (b) said ester is an ester of phosphoric acid.

36. The process of claim 35 wherein in component (b) said ester is a phosphoric acid ester of octyl alcohol.

37. The process of claim 35 wherein in component (b) said ester is a phosphoric acid ester of nonyl alcohol.

38. The process of claim 31 wherein component (a) is an N-alkyl sulfonyl glycine, component (b) is a phosphoric acid ester of octyl alcohol, component (c) is ethylene diamine tetraacetic acid and component (d) is a water soluble salt of zinc.

39. The process of claim 38 wherein said composition is added in an amount to provide from about 400 to about 10,000 ppm of said components (a), (b), (c) and (d) based on the weight of acid gas absorbent agent.

40. The process of claim 34 wherein said composition is added in an amount to provide from about 400 to about 10,000 ppm of said components (a), (b), (c) and (d) based on the weight of acid gas absorbent agent.

* * * * *

UNITED STATES PATENT OFFICE
CERTIFICATE OF CORRECTION

Patent No. 3,923,954          Dated December 2, 1975

Inventor(s) Ernest Petrey Jr. and Clinton Dale Breland

It is certified that error appears in the above-identified patent and that said Letters Patent are hereby corrected as shown below:

Column 5, lines 24-31 - in the formula "q" is absent ; add to last line.

Column 6, lines 58 and 59, "arrangeement" should be --arrangement--;

Column 14, line 18, correct "digylcolamine" to read --diglycolamine --;

IN THE CLAIMS:

Column 17, line 21, "sulfonly" should be -- sulfonyl --;

line 60, delete "and", insert -- said --;

Column 19, "q" should read as -- $q^-$ --.

Signed and Sealed this eighteenth Day of May 1976

[SEAL]

Attest:

RUTH C. MASON
*Attesting Officer*

C. MARSHALL DANN
*Commissioner of Patents and Trademarks*